United States Patent Office 2,819,586
Patented Jan. 14, 1958

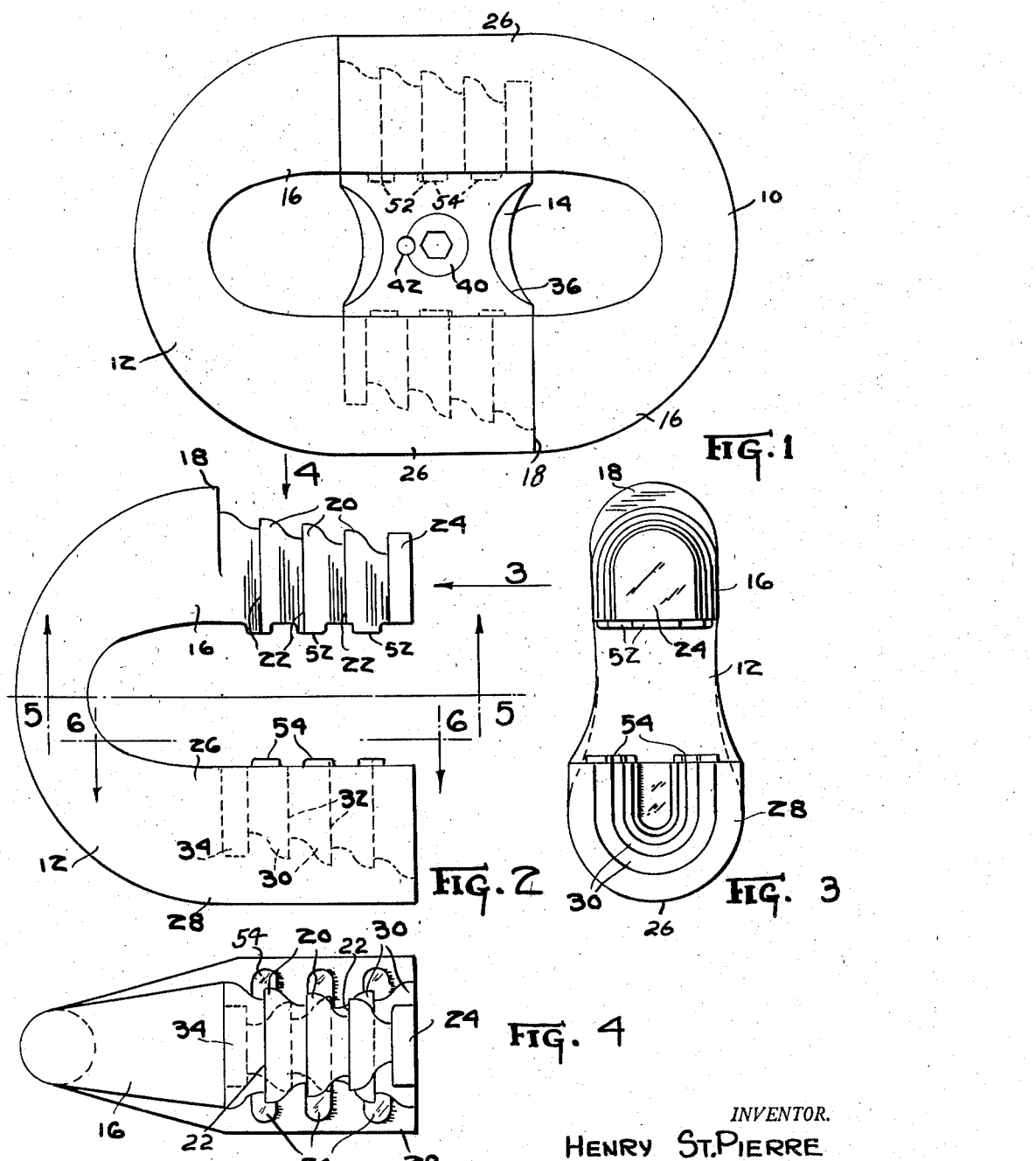

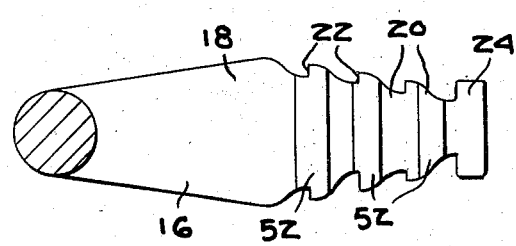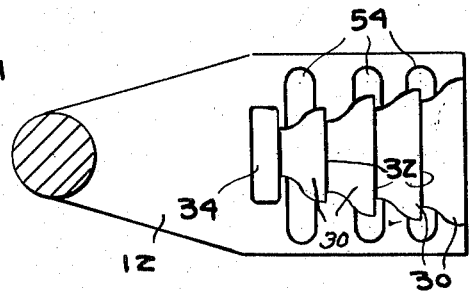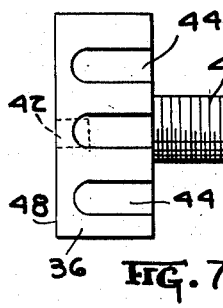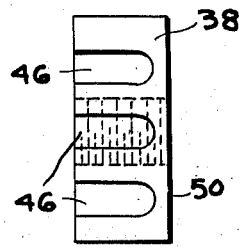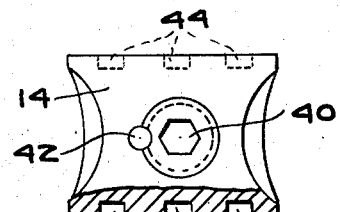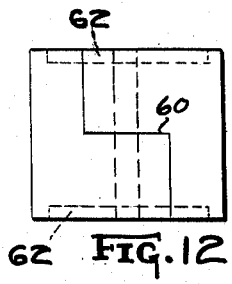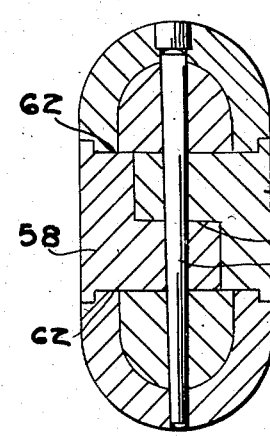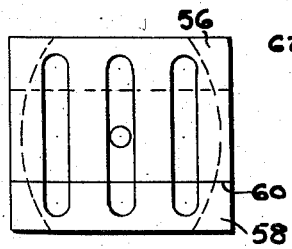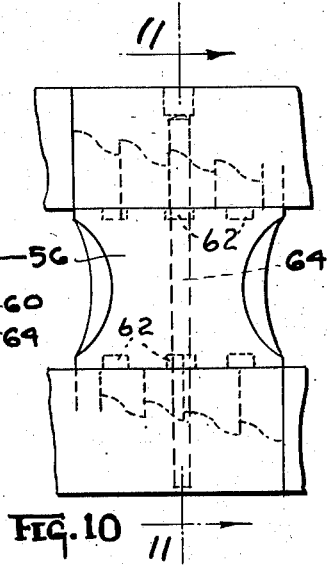

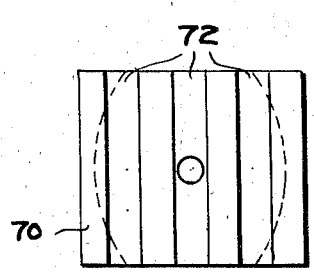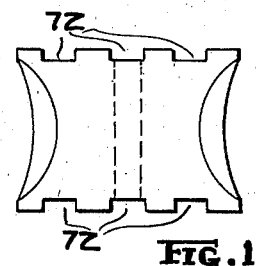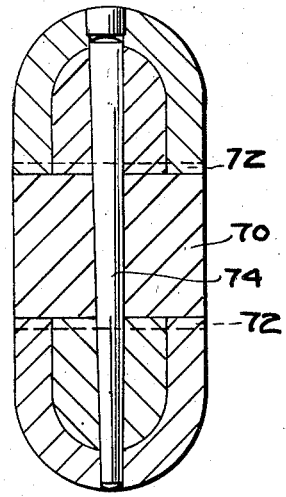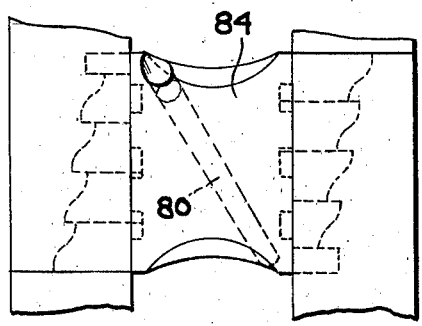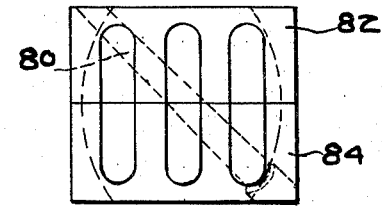

2,819,586

JOINER LINK WITH TWO PART BRACING MEANS HAVING STOP MEANS THEREON

Henry St. Pierre, Worcester, Mass.

Application June 22, 1951, Serial No. 233,019

1 Claim. (Cl. 59—85)

This invention relates to new and improved joiner links involving multiple parts which are detachable, the main features of which reside in the accessability or ease of putting the various parts of the link together so as to connect parts of chains, shackles, etc. while still retaining sufficient strength in the joiner link to correspond with the strength of the chain to as great a degree as possible.

An object of the present invention resides in the provision of such a joiner link having a new and improved construction increasing the strength thereof without increasing the amount or weight of metal content thereof; the provision of a joiner link as aforesaid including two generally U-shaped or horseshoe-shaped parts, each of which has a pair of leg portions that interfit with complementary portions on the other part, and each of which is provided with stepped areas having shoulders lying in spaced planes extending transversely of the link major axis and of the general direction of stress, to the end that these shoulders jointly assume the strain imposed on the chain; and being multiple, divide the strain between several of the steps; and the provision of a joiner link as described including a stud having teeth thereon engaging with teeth on the stepped leg portions of said U-shaped joiner link parts to additionally take up stress in the direction indicated and to prevent the parts of the link from becoming detached in a lateral direction.

Other objects and advantages of the invention will appear hereinafter.

Reference is to be had to the accompanying drawings, in which

Fig. 1 is a view in elevation of a jointer link illustrating one form of the invention;

Fig. 2 is a view in elevation of one of the link U-shaped parts;

Fig. 3 is an end view of the link part, looking in the direction of the arrow 3 in Fig. 2;

Fig. 4 is a top plan view thereof, looking in the direction of the arrow 4 in Fig. 2;

Fig. 5 is a section on line 5—5 of Fig. 2;

Fig. 6 is a section on line 6—6 of Fig. 2;

Fig. 7 is a top plan view of one of the stud parts of Fig. 1;

Fig. 8 is a top plan view of the other stud part;

Fig. 9 is a view in elevation of one of the stud parts, parts being in section;

Fig. 10 is a view in elevation of a modified link, parts being broken away;

Fig. 11 is a section on line 11—11 of Fig. 10;

Fig. 12 is a view in elevation of the stud of the link shown in Fig. 10;

Fig. 13 is a top plan view thereof;

Fig. 14 is a vertical section through a modified stud and link;

Fig. 15 is a top plan view of the stud of Fig. 14;

Fig. 16 is a view in side elevation thereof;

Fig. 17 is a view in elevation of a further modification; and

Fig. 18 is a view in side elevation thereof.

Referring now to Fig. 1, there is here shown one of the forms of the present invention comprising a U-shaped chain link part 10 and an identical chain link part 12 which connects therewith to form a link, and including a stud generally indicated at 14. This stud provides a pair of eyes for accommodating other links of the chain, shackles, etc. By reason of the fact that the joiner link is made of parts that are assembled and secured together without being permanently secured, lengths of chain may be joined, shackles and swivels added, etc., and other connections may be made as desired.

Each of the joiner link parts 10 and 12 comprises a generally U-shaped or horseshoe-like member as best shown in Fig. 2. The end of the leg 16 is reduced in size from the outer aspect at the edge of the link as at 18 and is formed with a series of gradually decreasing steps indicated at 20, these steps providing a series of gradually shortened flat U-shaped shoulders 22 which lie in spaced parallel planes extending across the link. This relation is clearly shown in Fig. 1. The end portion 16 terminates in an upstanding lug 24 which provides an additional shoulder similar to those at 22.

The other leg of the U-shaped link part is indicated at 26 and instead of being reduced in size is actually enlarged, see Fig. 3 as indicated at 28. This enlargement is hollowed out in a series of increasing steps indicated at 30, forming shoulders 32 complementary to those at 22, there being a specially formed pocket at 34 for the reception of lug 24 on the other leg part 10.

These two link parts are assembled by arranging them in overlapping relation with all of the four legs of the two U-shaped parts in the same plane and then relatively moving the link parts laterally respective to the major axis of the link, so that the steps 20 of link part 10 are all received in the hollowed-out steps 30 in the enlarged portion 28 of the link part 12, and vice-versa. This construction provides a plurality of U-shaped shoulders or steps providing a comparatively large surface of contact for preventing breakage when the link is under stress as well as preventing the link parts from being detached. Clearly, if there were but a single shoulder 32 and 22, the link would be only approximately one-quarter as strong as it is with the four shoulders which are shown herein. Of course the number of shoulders may be varied as required by size of link or difference in use.

Once the link parts have been assembled as stated above, the stud 14 may be applied. In the Fig. 1 construction, this stud includes two separate parts which may be referred to as a right and left, the left-hand part being shown at 36 in Fig. 7 and the right-hand part at 38 in Fig. 8. Only part 36 appears in Fig. 1 and these two parts are bolted together as by a bolt or large set-screw 40 which may be provided with a lead plug 42 to prevent any backing off of the bolt 40.

It will be seen that this stud prevents lateral separating motion of the two U-shaped parts 10 and 12 and therefore holds the link in assembled relation against any tendency to come apart in this direction, as well as providing for great strength in resistance to elongation of the link under stress due to the inability of the link to decrease in width at the center.

Each part of the stud is provided with indentations 44, 46 at both top and bottom thereof, these indentations terminating inwardly of the outside edges of the respective stud parts, such outside edges being clearly indicated at 48 and 50 respectively. These indentations interfit with complementary teeth 52 and 54 which appear on both the reduced portion and the enlarged hollowed-out portion of both of the link parts 10 and 12. This construction will be seen to provide full teeth for reception in the combined indentations 44, 46 by combining teeth 52 on link part 12 with the corresponding teeth 54 on link part 10. Hence each stud part 36, 38 engages combined teeth 52, 54 at each side thereof and each stud part therefore tends to aid in holding both link parts against longitudinal separation under stress.

The construction described provides one which is extremely easy to operate in the field both for assembling and disassembling chain, shackles, etc., and at the same time the strength of the present joiner link is enhanced over that of any of the prior art due to the multiple interlocking step and tooth construction.

Referring now to Fig. 10, there is herein shown a similar construction wherein the link parts 10 and 12 are the same as before in most major aspects thereof but the stud parts 56 and 58 are different in that instead of meeting in a flat central plane they overlap each other as seen at 60. The same toothed construction is provided as before as indicated at 62.

In this case, the parts are not bolted together as previously described but may be drilled and reamed for the reception of a long taper pin 64 extending transversely through the center of the link as will be clear in Figs. 10 and 11. A lead plug 66 may be used to prevent the pin from coming out although of course it may be removed when desired.

Figs. 14 and 15 illustrate a solid toothed stud 70, the teeth of whch at 72 extend all the way across the top and bottom thereof as indicated clearly in these figures and the complementary teeth on the link parts 10 and 12 also extend all the way across and do not terminate as clearly indicated for instance in Fig. 4 of the modification first described.

Therefore, in this case, the parts 10 and 12 being assembled, the single solid stud may be slid in from either side, and then the pin 76 may be used to hold the stud against lateral movement.

Figs. 17 and 18 illustrate a further form of stud which is similar to that of Fig. 1 in all respects except that instead of using a bolt, a diagonal taper pin 80 is used to run through both the stud parts 82, 84 when engaged with the teeth 52. This pin, however, does not extend into any part of link parts 10 and 12 so that only the stud itself is thus held in the manner of bolt 40.

Under some conditions, it is advisable to use the taper pins, but under other conditions it has been found that the taper pins do not secure the parts together as well as the bolt 40 at Fig. 1.

In any event, a stronger, more easily operated and joined connector or joiner link is thus provided, this joiner link being of any size and extending well into the large sizes of chain, particularly for anchor chain in areas of frequent strain and relaxation where constantly changing conditions soon cause wear or damage to the ordinary joiner link of the prior art.

Having thus described my invention and the advantages thereof, I do not wish to be limited to the details herein disclosed, otherwise than as set forth in the claim, but what I claim is:

A joiner link comprising a pair of generally U-shaped parts each having two legs one of which is reduced and solid and the other of which is enlarged and hollow, the respective solid and hollow leg portions interfitting to form the link, gradually decreasing steps on the solid portions forming shoulders in spaced planes transversely of the link, gradually increasing complementary steps forming complementary shoulders in the hollows of the enlarged portions, said steps and shoulders all facing in the same direction toward a side aspect of the link whereby the parts thereof are assembled only by a relative lateral motion thereof, raised teeth on the solid portion and the hollow portion, said teeth facing each other and being separate and independent of the steps and shoulders, a stud having indentations at opposite sides thereof receiving the respective teeth, and means to prevent separation of the stud, the teeth and indentations being shorter than the respective widths of the legs and stud, and terminating short of the side edges thereof.

References Cited in the file of this patent

UNITED STATES PATENTS

| 859,082   | Kenter    | July 2, 1907  |
| 2,277,567 | St. Pierre | Mar. 24, 1942 |

FOREIGN PATENTS

| 343,420 | France  | Oct. 6, 1904 |
| 316,681 | Germany | Dec. 1, 1919 |